United States Patent [19]

Couture et al.

[11] Patent Number: 5,753,991
[45] Date of Patent: May 19, 1998

[54] MULTIPHASE BRUSHLESS AC ELECTRIC MACHINE

[75] Inventors: Pierre Couture, Boucherville; Bruno Francoeur, Loretteville, both of Canada

[73] Assignee: Hydro-Quebec, Montreal, Canada

[21] Appl. No.: 353,241

[22] Filed: Dec. 2, 1994

[51] Int. Cl.[6] .................................................. H02K 21/12
[52] U.S. Cl. .......................... 310/156; 310/180; 310/216; 310/254; 310/261
[58] Field of Search .................................. 310/156, 159, 310/217, 180, 261, 265, 267, 254, 259, 216

[56] References Cited

U.S. PATENT DOCUMENTS

| | | | |
|---|---|---|---|
| 2,695,370 | 11/1954 | Brouwer | 310/152 |
| 3,234,416 | 2/1966 | Weitbrecht | 310/153 |
| 3,604,961 | 9/1971 | Saldinger | 310/51 |
| 4,341,969 | 7/1982 | Sievert | 310/154 |
| 4,692,646 | 9/1987 | Gotou | 310/184 |
| 4,876,472 | 10/1989 | Shiraki et al. | 310/198 |
| 4,940,912 | 7/1990 | Kant et al. | 310/162 |
| 4,940,913 | 7/1990 | Fritzsche | 310/216 |
| 4,980,594 | 12/1990 | Poro | 310/168 |
| 4,994,702 | 2/1991 | Arita | 310/254 |
| 5,105,113 | 4/1992 | Ishikura et al. | 310/154 |
| 5,142,179 | 8/1992 | Nakamura et al. | 310/217 |
| 5,162,684 | 11/1992 | Hayakawa | 310/154 |
| 5,170,084 | 12/1992 | Fujita | 310/154 |
| 5,196,751 | 3/1993 | Spirk | 310/254 |
| 5,204,569 | 4/1993 | Hino et al. | 310/154 |
| 5,206,556 | 4/1993 | Hayakawa | 310/154 |
| 5,327,034 | 7/1994 | Couture et al. | 310/67 |

FOREIGN PATENT DOCUMENTS

| | | | |
|---|---|---|---|
| A-0409661 | 1/1991 | European Pat. Off. | |
| 55-53164 (A) | 4/1980 | Japan | 310/156 |
| 57-3570 (A) | 1/1982 | Japan | 310/12 |

OTHER PUBLICATIONS

Reduction of Cogging Torque in Permanent Magnet Motors, Li et al., IEEE Transactions on Magnetics, vol. 24, No. 6, Nov. 1988, pp. 2901–2903.

A Novel High Power Density Permanent Magnet Motor Drive for Electric Vehicles, Chan et al., Symposium Proceedings, First Volume Sessions 1–9, 27–30 Sep. 1992, pp. 1–12.

Design of Brushless Permanent–Magnet Motors, Hendershot Jr., Magna Physics Corporation, 1991, pp. 191–195.

*Primary Examiner*—Thomas M. Dougherty
*Assistant Examiner*—Jonathan Link
*Attorney, Agent, or Firm*—Foley & Lardner

[57] ABSTRACT

The multiphase brushless AC electric machine comprises a stator frame having a surface provided with parallel slots and projections disposed alternately, each of the openings being substantially as wide as the widest width of the corresponding slot; and a rotor frame having a surface provided with permanent magnet means having respective surface sections facing the slots and projections. All of the surface sections of the magnet means produce a magnetic flux density having a component average amplitude $B_r(\theta)$ perpendicular to the corresponding surface of the stator, which is substantially defined by the following equation:

$$B_r(\theta) = M_r(\theta) \cdot L_a(\theta)/L_v(\theta)$$

where $L_a(\theta)$ is defined by the following equation:

$$L_a(\theta) = \text{abs}\left[ \frac{C \cdot L_v(\theta)}{M_r(\theta)} \sin\left(\frac{K \cdot \theta}{2}\right) \right], \text{ and}$$

where $\theta$ is a position angle in radians with respect to a reference position on the rotor frame; $B_r(\theta)$ is the component average amplitude at the position angle $\theta$; $L_v(\theta)$ is a gap distance between the projections and the surface of the rotor frame at the position angle $\theta$; $M_r(\theta)$ is a component of residual induction of the magnet means at the position angle $\theta$, $M_r(\theta)$ being perpendicular to the corresponding surface of the stator, $M_r(\theta)$ being alternative with a period corresponding to $4\pi/K$; K is an even number representative of all of the surface sections; and C is an arbitrary constant. The present invention is also concerned with a method of operating the multiphase brushless AC electric machine.

20 Claims, 10 Drawing Sheets

MULTIPHASE BRUSHLESS AC ELECTRIC MACHINE

FIELD OF THE INVENTION

The present invention is concerned with a multiphase brushless AC electric machine having a stator frame and a rotor frame.

BACKGROUND OF THE INVENTION

Known in the art, there is a cylindrical rotary machine having an outer rotor and an inner stator. In this kind of machine, magnets are fixed on the internal wall of the steel cylinder head of the machine and produce a magnetic field which is channelled around a series of conductors by means of steel projections. Electrical currents circulate through the conductors and react to the magnetic field produced by the magnets to induce a rotating torque. By controlling these electrical currents, it is possible to control the magnitude and the direction of the rotating torque.

Also known in the art, there is the U.S. Pat. No. 5,327,034 of COUTURE et al., granted on Jul. 5, 1994. The electrically motorized wheel assembly shown in this patent is more specifically used as a drive system where the machine is included in a wheel. The rotor drives without electrical contacts directly a rim which supports a tire, and the stator is fixed onto a central portion of the wheel.

The performance in operation of this machine is dependent upon the geometry of the magnetic circuit used and upon the characteristic of each of the magnetic field produced by the electrical currents and by the magnets.

First, we have to consider the effect of the magnetic field strength produced by the current in the conductors on the flux density distribution in the stator frame. The magnetic circuit of the stator is composed of metal sheets having a non linear magnetization curve that shows a high initial permeability until it reaches a magnetizing force level where it falls to a value equivalent to the permeability of the air. The distribution of the flux density in the metal sheets results from the addition of the magnetic fields strength produced by the current in the conductors and by the magnets, in relation to the magnetization curve. When operating in the high permeability region of the magnetization curve, the flux density increases proportionally with the increase of the current in the conductors and so does the rotating torque.

In this case, the magnetic field resulting from the sum of the two sources is maintained below the saturation threshold in all regions of the magnetic circuit. The current in the conductors can be increased until it reaches a level where the total magnetizing force goes beyond the saturation threshold and the flux density no longer follows with the same proportion. This phenomenon occurs in the regions of the magnetic circuit where both magnetizing forces are cumulative. At this point the rotating torque begins to be distorted, ceases to increase linearly and tends to saturate with the increase of the current in the conductors.

Second, the fluctuation of the flux density in the stator metal sheets is a factor which results in losses related to hysteresis effects and Eddy currents. These losses are proportional to harmonics contained in the flux density.

Third, the cogging torque produced by the attraction between each of the magnets and the projections during the rotation of the rotor should be considered. Furthermore, the torque harmonics generated by the product of the conductor currents with the magnet field should be added to the cogging torque.

Fourth, the filling percentage of the space available in the slots with copper conductor affects the machine weight and the thermal conductivity between the copper conductor and the steel.

Fifth, the geometry of the magnetic circuit must be used to channel the maximum flux density without going into saturation to minimise the total weight of the machine.

It can be seen that several factors occurring at the same time when the machine is in operation should be considered. All of these factors define the machine performances which are important when the machine is used as a motor wheel.

Known in the art, there is the book of J.R. Hendershot Jr. entitled "Design of brushless permanent magnet motors", which proposes different geometries to partially eliminate the problems mentioned above. In this book, some rules are proposed for the design of a magnet machine with outer rotor. The rotor is made of a cylindrical cylinder head provided with magnets of rectangular shape. The stator is made of projections skewed by one slot step along its axial length with respect to the rotor. The projections of the stator must be provided with tips partially covering the lots to allow a minimum opening which is necessary to insert the conductors one by one in the corresponding slot.

The tips must have a relatively uniform thickness to prevent saturation by the magnet magnetizing field.

In such machine, the skew of the stator slot reduces cogging torque. The slot skew induces a progressive phase-shifting of the cogging torque along the length of each stator projection so that, globally, all the harmonics are cancelled. The slot skew has been used in the assembly of U.S. Pat. No. 5,327,034. This is a simple solution but, from a practical point of view, the construction complexity is increased and the skew is difficult to implement in the case where the axial length of the stator along the rotation axis is relatively short. Because of the tips, it is possible to channel a maximum portion of the magnetic flux while minimizing the amount of magnets necessary to produce a magnetic field around the conductors. But, because of these tips, the conductors have to be inserted in the corresponding slot one by one and therefore the use of rectangular cross section conductors is almost impossible as it is very difficult to pill up the conductors in the slot with order. Also, because of these tips, it will not be possible to use large rectangular cross section conductors.

Furthermore, because of these tips, there is an increase of the magnetic field strength generated by the current in the conductors and by which the magnetic flux induced tries to leak between the tips of a same slot. Additionally to the magnetic field strength generated by the magnets, the total field strength in the regions where it is cumulative reaches a saturation threshold at a low current level. The linear portion of the torque versus current curve is limited to a low current value.

Also known in the art, is the article from IEEE No. 0018-9464/88/1100-2901 where there is shown a linear machine having a non-skewed stator with respect to the rotor. In this type of machine, a rectangular magnet with uniform magnetization is used. It is coupled with the non-skewed stator which is provided with projections without slot tips.

The axial length w of the magnet is equal to $(n+0.14)p$ where n is an integer and p represents the slot step. The ratio $y/p$, which is the axial length y of a projection of the stator over the polar step p, is equal to 0.5.

In this type of machine, the fundamental component of the cogging torque is eliminated. The fundamental component of the reluctance torque of the projection which leaves the magnet from one side thereof cancels the corresponding fundamental component of the following projection which comes near the magnet from the other side thereof. Then, only the torque harmonics of lower amplitude remains. The best results are obtained when the ratio y/p is of 0.5. With this solution, the machine construction is simplified, but all the negative effects mentioned above are not eliminated. It should be appreciated that the flux produced in one projection of the stator evolves during a rotation according to a trapezoid shape. This shape is due to the rectangular shape of the magnets. The flux density in the projections and in the remaining parts of the stator comprises more than one harmonic. Each harmonic induces eddy current which generates a loss that is added to the total loss of the machine. These losses are added to the ones caused by the fundamental component. Also, the shape of the flux picked up by the windings depends on how the stator has been wound up. With a simple winding, one phase by slot by pole, there are flux harmonics which cause torque ripple if the currents in the phases are sinusoidal. It is always possible to reduce the ripple by increasing the number of slots under each pole and by using windings which are fitted into each other to filter the flux harmonics but, in this case, the complexity of the assembly is increased. And finally, the ratio y/p is a limit on possible geometries.

Also known in the art, there is the paper entitled "A Novel High Power Density Permanent Magnet Motor Drive For Electric vehicles" published in Symposium proceedings, EVS 11, 1992. This machine is provided with rectangular magnets and uses another technique to prevent the cogging torque. This machine is provided with rectangular magnets which are glued to the inner wall of the rotor. The stator has projections with tips which partially cover the slots. The slots are filled with circular conductors. The ratio of the pole number of the rotor with respect with the slot number of the stator is of 11/10.

The object of what is proposed in this document is to reduce the cogging torque. The ratio of the pole number of the rotor with respect to the pole number of the stator is divisive. The torque resulting from the sum of the torques induced by each of the rotor poles over the stator is uniform. But, loss problems in the sheet metal associated with flux harmonics are always present. In order to obtain a uniform torque when loaded, the currents in the windings must have a trapezoid shape. These current harmonics produce additional losses due to the skin effect. It has to be appreciated that this machine also uses projections with slot tips.

Also known in the art, there is the U.S. Pat. No. 3,604, 961. The machine described in this patent is of the DC type and uses a stator with poles having permanent magnets which are shaped to reduce the cogging torque when the rotor frame is rotating. The machine has a rotor provided with projections and with slots without tips where current conductors are located. The stator poles cover a peripheral portion of the rotor with a constant air gap. The cogging torque of the machine results from permeability variation induced by the successions of the slots and projections of the rotor in front of each pole of the stator. A pole produces an alternative cogging torque with positive and negative maxima having the same magnitude. In a standard machine of this type, the poles are 180 electrical degrees apart from one another. The positive and negative maxima of the cogging torque produced by each pole contribute to increase the global cogging torque. It is possible to phase-shift one pole out of two by an angle such that the positive maximum of half of the poles corresponds to the negative maximum of the other half. Thus, the sum of the cogging torques produced by one half of the poles cancels the sum of the cogging torques produced by the other half. The proposed pole geometry consists in removing a portion from each pole. The removed portions are adjacent from one pole to the other. Thus, it is possible to obtain the phase-shift of a pole without physically phase-shifting the whole pole. With this method, the construction of the motor is simplified. However, because of the flat profile of the poles, flux harmonics are produced along the magnetic paths, which increase iron losses.

Also known in the art, there are the U.S. Pat. Nos. 5,162,684; 5,206,556; 5,170,084; and 5,204,569. All of these patents show means for producing a substantially sinusoidal flux in a pole of the rotary frame of a DC machine provided with brushes, from magnets mounted on the stator frame. With this method, in operation, the cogging torque is reduced. But, all of the machines described in these patents use brushes and consequently they are complex and necessitate more maintenance.

Also known in the art, there are the following U.S. Pat. Nos. 4,940,912; 4,994,702; 4,341,969; 5,142,179; 4,980, 594; 4,876,472; 5,105,113; 3,234,416; and 2,695,370. None of the above patents solves, at the same time, the problem of the cogging torque, and the problem of icon losses associated to the production of harmonics.

A first object of the present invention is to propose a brushless polyphase AC electric machine having a torque versus current curve that is linear within a larger current band.

A second object of the present invention is to propose a brushless polyphase AC electric machine that has low losses due to harmonics distortion of the flux density within the stator frame.

A third object of the present invention is to propose a brushless polyphase AC electric machine having low cogging torque between the rotor frame and the stator frame in both loaded and unloaded condition.

SUMMARY OF THE INVENTION

According to the present invention, there is provided a multiphase brushless AC electric machine comprising:

a stator frame having a surface provided with parallel slots and projections disposed alternately, each of said slots having an opening onto said surface, each of said openings being substantially as wide as the widest width of the corresponding slot; and a rotor frame having a surface provided with permanent magnet means having respective surface sections facing said slots and projections, each of said surface sections facing a number of said slots which corresponds to a number of phases upon which said machine operates, all of said surface sections of said magnet means producing a magnetic flux density having a component average amplitude $B_r(\theta)$ perpendicular to the corresponding surface of the stator, which is substantially defined by the following equation:

$$B_r(\theta) = M_r(\theta) \cdot L_a(\theta)/L_v(\theta)$$

where $L_a(\theta)$ is defined by the following equation:

$$L_a(\theta) = abs\left[ \frac{C \cdot L_v(\theta)}{M_r(\theta)} \sin\left( \frac{K \cdot \theta}{2} \right) \right], \text{ and}$$

where $\theta$ is a position angle in radians with respect to a reference position on said rotor frame; $B_r(\theta)$ is said component average amplitude at said position angle θ; $L_v(θ)$ is a gap distance between said projections and said surface of said rotor frame at said position angle θ; $M_r(θ)$ is a component of residual induction of said magnet means at said position angle θ, $M_A(v)$ being perpendicular to the corresponding surface of the stator, $M_r(θ)$ being alternative with a period corresponding to $4π/K$; K is an even number representative of all of said surface sections; and C is an arbitrary constant, whereby, in operation, said rotor frame is magnetically coupled to said stator frame while reducing losses due to harmonic distortion of magnetic flux density within said stator frame, having a torque versus current curve that is linear within a larger current band and reducing cogging torque between said stator frame and said rotor frame.

Also according to the present invention, there is provided a method of operating a multiphase brushless AC electric machine, comprising the steps of:

magnetically coupling a stator frame provided with windings with a rotor frame, the stator frame having a surface provided with parallel slots and projections disposed alternately, each of said slots having an opening onto said surface, each of said openings being substantially as wide as the widest width of the corresponding slot, the rotor frame having a surface provided with permanent magnet means having respective surface sections facing said slots and projections, each of said surface sections facing a number of said slots which corresponds to a number of phases upon which said machine operates, all of said surface sections of said magnet means producing a magnetic flux density having a component average amplitude $B_r(θ)$ perpendicular to the corresponding surface of the stator, which is substantially defined by the following equation:

$$B_r(θ)=M_r(θ)·L_a(θ)/L_v(θ)$$

where $L_a(θ)$ is defined by the following equation:

$$L_a(θ) = abs\left[ \frac{C·L_v(θ)}{M_r(θ)} \sin\left( \frac{K·θ}{2} \right) \right], \text{ and}$$

where θ is a position angle in radians with respect to a reference position on said rotor frame; $B_r(θ)$ is said component average amplitude at said position angle θ; $L_v(θ)$ is a gap distance between said projections and said surface of said rotor frame at said position angle θ; $M_r(θ)$ is a component of residual induction of said magnet means at said position angle θ, $M_r(θ)$ being perpendicular to the corresponding surface of the stator, $M_r(θ)$ being alternative with a period corresponding to $4π/K$; K is an even number representative of all of said surface sections; and C is an arbitrary constant; and energizing the windings of the stator, whereby, in operation, said rotor frame is magnetically coupled to said stator frame while reducing losses due to harmonic distortion of magnetic flux density within said stator frame, having a torque versus current curve that is linear within a larger current band and reducing cogging torque between said stator frame and said rotor frame.

The objects, advantages and other features of the present invention will become more apparent upon reading of the following non restrictive description of a preferred embodiment thereof, given for the purpose of exemplification only, with reference to the accompanying drawings.

DETAILED DESCRIPTION OF THE DRAWINGS

In the present description, the same numbers throughout the drawings refer respectively to similar elements.

Figure 1:
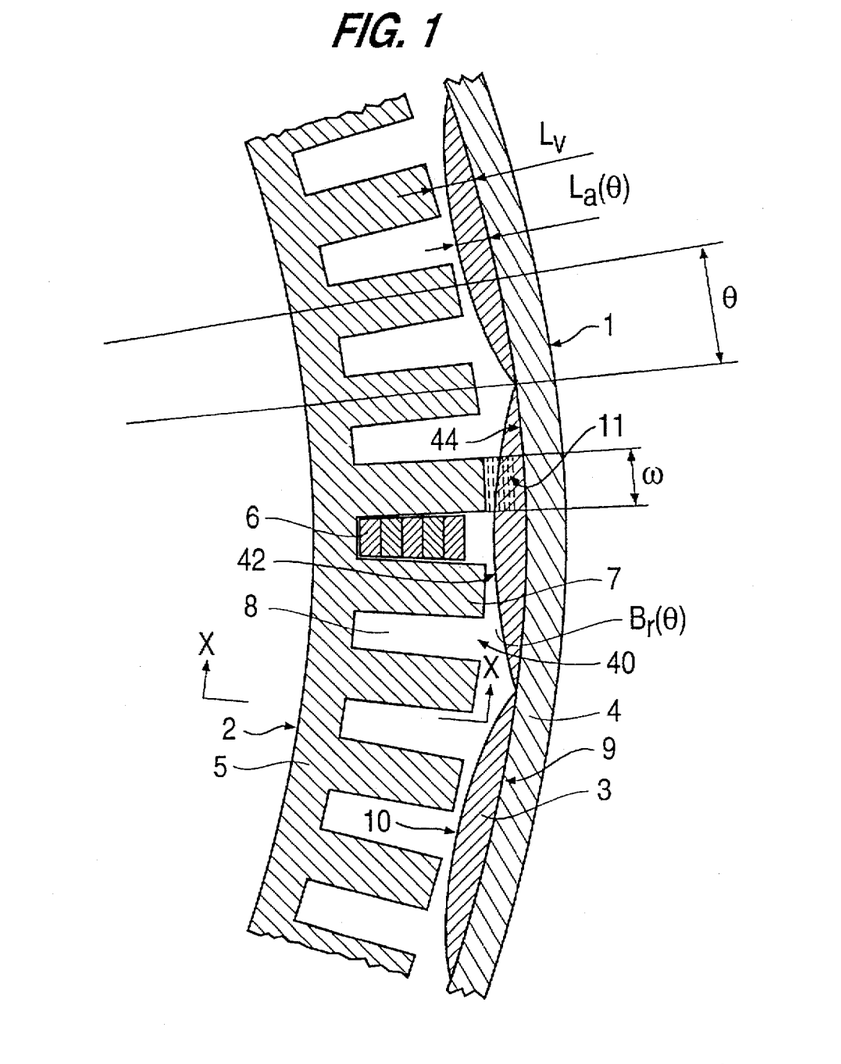
FIG. 1 is a partial side cross section view of the stator and rotor frames of a multiphase brushless AC electric machine according to a first embodiment of the present invention.

Referring now to FIG. 1, there is shown a partial side cross section view of the stator and the rotor frames of a multiphase brushless AC electric machine. The multiphase brushless AC electric machine comprises a stator frame 2 having a surface provided with parallel slots 8 and projections 7 disposed alternately, each of the slots 8 having an opening 40 onto the surface, each of the openings 40 being substantially as wide as the widest width of the corresponding slot 8.

The machine also comprises a rotor frame 1 having a surface 44 provided with permanent magnet means 3 having respective surface sections 42 facing the slots 8 and projections 7, each of the surface sections 42 facing a number of the slots 8 which corresponds to a number of phases upon which the machine operates. Preferably, in the present case, each of the surface sections 42 faces three slots 8.

All of the surface sections 42 of the magnet means 3 produce a magnetic flux density having a component average amplitude $B_r(θ)$ perpendicular to the corresponding surface of the stator 2, which is substantially defined by the following equation:

$$B_r(θ)=M_r(θ)·L_a(θ)/L_v(θ)$$

where $L_a(\theta)$ is defined by the following equation:

$$L_a(\theta) = \text{abs}\left[\frac{C \cdot L_v(\theta)}{M_r(\theta)} \sin\left(\frac{K \cdot \theta}{2}\right)\right], \text{ and}$$

where $\theta$ is a position angle in radians with respect to a reference position on the rotor frame 1. $B_r(\theta)$ is the component average amplitude at the position angle $\theta$. $L_v(\theta)$ is a gap distance between the projections 7 and the surface 44 of the rotor frame 1 at the position angle $\theta$. $M_r(\theta)$ is a component of residual induction of the magnet means 3 at the position angle $\theta$. $M_r(\theta)$ is perpendicular to the corresponding surface of the stator 2. $M_r(\theta)$ is alternative with a period corresponding to $4\pi/K$. K is an even number representative of all of the surface sections 42 and C is an arbitrary constant, whereby, in operation, the rotor frame 1 is magnetically coupled to the stator frame 2 while reducing losses due to magnetic flux density in the stator frame 2, having a torque versus current curve that is linear within a larger current band and reducing cogging torque between the stator frame 2 and the rotor frame 1.

By means of the characteristics mentioned above it is possible to obtain a brushless polyphase AC electric machine having a torque versus current curve that is linear within a larger current band.

Also, it is possible to obtain a brushless polyphase AC electric machine that has low losses due to harmonics distortion of the flux density within the stator frame.

Also, it is possible to obtain a brushless polyphase AC electric machine having low cogging torque between the rotor frame and the stator frame in both loaded and unloaded condition.

Also, it is possible to obtain a brushless polyphase AC electric machine that can use square cross section conductors of coils to wind the stator frame.

Preferably, the stator frame 2 has a cylindrical shape, the surface provided with parallel slots 8 and projections 7 being an outer surface of the stator frame 2. The rotor frame 1 has a cylindrical shape, the surface 44 provided with permanent magnet means 3 being an inner surface of the rotor frame 1.

Preferably, the average amplitude $B_r(\theta)$ is a radial component, each of the slots 8 has a rectangular cross section and the permanent magnet means 3 comprise a series of permanent magnets 3 made of a homogeneous material, each of the magnets 3 having a thickness with respect to the position angle $\theta$ determined substantially by $L_a(\theta)$. Each of the projections 7 is square ended.

In operation, the method of operating the multiphase brushless AC electric machine shown in FIG. 1 according to the present invention, comprises the steps of magnetically coupling the stator frame 2 which is provided with windings 6 with the rotor frame 1, and energizing the windings 6 of the stator 2, whereby, in operation, the rotor frame 1 is magnetically coupled to the stator frame 2 while reducing losses due to magnetic flux density in the stator frame 2, having a torque versus current curve that is linear for a larger current band and reducing cogging torque between the stator frame 2 and the rotor frame 1.

According to a preferred embodiment, the cylindrical rotor 1 comprises a cylinder head 4 made of steel and a number of K magnets 3 mounted onto the internal wall of the cylinder head 4, where K is an even integer. The cylinder head 4 of the rotor 1 is separated from the cylindrical stator 2 by a distance $L_v$. The stator 2 is made of magnetic sheet metal 5 forming a series of non-skewed projections 7 and slots 8 open towards the rotor 1.

Preferably, rectangular cross section conductors 6 are mounted in the slots 8. All of the conductors 6 mounted in a same slot 8 correspond to a same phase. The number of phases can vary from two to N where N is an integer greater than two. The stator 2 has N slots 8 for each magnet 3 of the rotor 1. The total number of slots 8 or projections 7 is equal to N·K.

Preferably, each magnet 3 has a high uniform intrinsic coercive force within the material and a magnetic permeability equal to the one of air. The cylinder head 4 and the sheet metal 5 are made of a high magnetic permeability material. The magnetization curve of each cylinder head 4 and sheet metal 5 is non-linear and reaches a saturation threshold where the permeability decreases to a value equal to the one of air. Each magnet 3 has an arc-shaped profile 9 for matching the internal circular wall of the rotor 1. Each magnet 3 has also a second opposite profile 10 defined in such a way that its radial thickness $L_v$ is defined by:

$$L_a(\theta) = \text{abs}\left[\frac{C}{M_r(\theta)} \sin\left(\frac{K \cdot \theta}{2}\right)\right]$$

where $\theta$ is the angular position in radians with respect to a reference position onto the rotor 1, $L_v(\theta)$ is the radial thickness of the magnet 3 at the position angle $\theta$, $M_r(\theta)$ is the residual induction radial component of the magnet 3 at the position angle $\theta$, $M_r(\theta)$ alternates with a period corresponding to $4\pi/K$, K is an even number representative of all the magnets 3 on the periphery of the rotor 1, and C is a constant.

The flux density channelled by one projection 7 is produced substantially by the magnet portion contained in the volume 11 located between the end of the corresponding projection 7 and the cylinder head 4. The average amplitude of the flux density radial component $B_r(\theta)$ in a section of the volume 11 is defined by:

$$B_r(\theta) = M_r(\theta) \cdot L_a(\theta)/L_v$$

where $L_v$ is the gap distance between the projection 7 of the stator 2 and the cylinder head 4 of the rotor 1. $B_r(\theta)$ is sinusoidal because $M_r(\theta)$ is alternating of 180° from one magnet to the next one. It is possible to define $B_r(\theta)$ by:

$$B_r(\theta) = \frac{C}{L_v} \sin(K \cdot \theta/2)$$

The shape of $B_r(\theta)$ is sinusoidal when the rotor 1 is rotating. This equation is valid at the condition that the machine is operated in the linear portion of the steel magnetization curve. In the case of the magnets 3 shown on FIG. 1, $L_a(\theta)$ varies according to a sine with respect to position angle $\theta$ because $M_r(\theta)$ is considered as being constant.

The current circulating through the conductors 6 produces a magnetic field which is added to the one produced by the magnets 3. The total flux density is the vectorial sum of the flux density produced by the magnets 3 and the flux density produced by the currents through the conductors 6.

Figure 12:
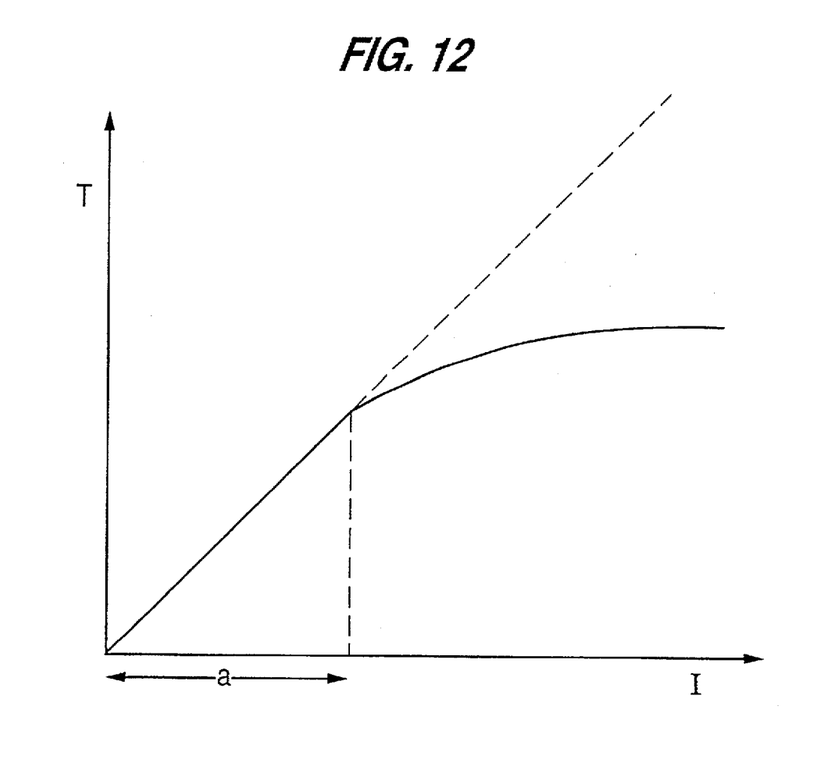
FIG. 12 is a diagram showing a machine operating curve of current I with respect to torque T.

With the present inventions it is possible to obtain a rotary machine producing a torque versus current curve which is linear for a current band (a) as shown in FIG. 12 that is larger than the one of similar machines of the prior art. The torque obtained with a machine according to the present invention is the tangential component of the force produced at the air gap radius. This force results from the vectorial product of the conductor currents with the magnetic field produced by the magnets 3.

When in operation, the phase current in the slots 8 alternates with the flux channelled by the projections 7 to produce a torque in the same direction. The vectorial product is proportional to the currents through the conductors 6 as long as the machine operates within the linear portion of the steel magnetization curve. The magnetic field produced by the magnets 3 is added to the one produced by the currents through the conductors 6. By increasing the current, a saturation of the flux density is produced in the zones where the sum of the fields is cumulative.

The zones which are affected by saturation act upon the field line distribution in the machine, Which limits a possible increase of the torque. The torque no longer responds linearly with the increase of the current in the conductors. A portion of the magnetic flux produced by the conductors 6 of one slot 8 leaks through the opening thereof. Because, in the present case, there are no slot tips, it is possible to maximize the magnetic path reluctance of the leaking flux. The saturation occurs at a much higher current and the torque versus current curve is linear for a current band that is larger than the one produced by a similar machine with slot tips.

In the present case, it is preferable to use magnets with higher residual induction to compensate the absence of slot tips.

According to another object of the present invention, which is obtained by a preferable embodiment of the present invention, the open slots 8 of the rotor 1 allow the use of a substantially rectangular cross section conductors for the windings. Thus, it is possible to obtain a filling factor which is superior to the one obtained when circular cross section conductors are used. Because of that, the slot section can be narrower and the length of the projections 7 for channelling the flux can be smaller. Consequently, the weight of the machine is smaller than the one of a similar machine of the prior art to obtain the same torque with a better efficiency.

Also, it is possible to use full width rectangular cross section conductor which increases the thermal conductivity between the copper conductor and the steel sheet metal by increasing the contact surface between the copper and the walls of the slots 8. Thus, it is possible to improve the transfer of the thermal energy produced by the heating or the conductors 6 to the exterior.

We will now explain how it is possible to reduce iron losses with the present invention. The steel of the stator 2 channels a flux which varies with respect to the rotation of the rotor 1. This variation of the flux produces Joules losses associated with the hysteresis effect of the magnetization curve and with the Eddy current induced in the steel of the sheet metal. The magnitude of the losses by Eddy current is proportional to the oscillation frequency and to the amplitude of the flux density within the steel. The total value of the losses is the sum of the losses produced by each flux density harmonic within the steel.

The flux density within a specific location within one of the projections 7 is proportional to $B_r(\theta)$. Therefore, it follows a sinusoidal variation with the rotation of the rotor 1. The inner band of the sheet metal 5 of the stator 2 is used as a feedback path for the magnetic field induced in the corresponding projections 7. The channelled flux density is the sum of sinusoidal fluxes, therefore this sum is also sinusoidal. The losses associated with the harmonics other than the fundamental component, within the sheet metal 5 of the stator 2, are negligible with respect to the loss due to the fundamental component. Consequently, the machine operates with reduced iron losses.

With the present invention, it is possible to obtain a rotary machine which has, in operation, a low torque ripple when loaded or unloaded. We will now explain how this result is obtained. The rotation of the rotor 1 with respect to the stator 2 produces an attraction force between the magnets 3 and the projections 7. This attraction force is associated, while rotating, with the energy variation which is stored in the magnetic field contained substantially within the air and magnet volumes 11 between each projection 7 and the cylinder head 4.

The tangential component of this attraction force for each projection 7 is added to the rotation torque. The torque T is defined as follows:

$$T = dW/D\theta$$

where W is the energy contained within the volume 11 and is defined by:

$$W = \int_V \frac{B_r(\theta)^2}{2\mu_0} dv$$

where the torque is valid as long as the steel is not saturated. The relative permeability within the volume 11 is close to one for the part of the magnet within the volume 11 so that $\mu_D$ is used for the total volume. The torque acting upon each of the projections 7 of the stator 2 is independent from one projection to the other.

The energy is the integral over angle $\Omega$, covered by the radial section of volume 11, of the radial component $B_r(\theta)$ multiplied by the axial length of the machine. This integral is defined as follows:

$$W = \int_{-\omega/2}^{\omega/2} \frac{\frac{C^2}{L_r^2} \sin^2\left(\frac{K}{2}[\theta+\phi]\right)}{2\mu_0} \cdot \frac{P \cdot (R_{ic}^2 - R_{es}^2)}{2} d\phi$$

where P is the axial length of the machine along the rotation axis thereof, $R_{ic}$ is the internal radius of the cylinder head 4 of the rotor 1, and $R_{es}$ is the external radius of the sheet metal 5 of the stator 2.

By resolving this integral it is possible to obtain:

$$W = \frac{C^2 \cdot P \cdot (R_{ic}^2 - R_{es}^2)}{4L_r^2 \cdot \mu_o} \left[ \frac{\omega}{2} - \left(\frac{1}{k}\right) \sin\left(\frac{K \cdot \omega}{2}\right) \cdot \cos(K \cdot \theta) \right]$$

The torque T is the derivative of W with respect to $\theta$. The torque T is defined as follows:

$$T = \frac{C^2 \cdot P \cdot (R_{ic}^2 - R_{es}^2)}{4L_r^2 \cdot \mu_o} \sin\left(\frac{K \cdot \omega}{2}\right) \cdot \sin(K \cdot \theta)$$

The cogging torque on each of the projection 7 is therefore sinusoidal and periodic over $1/(2\pi K)$. The total cogging torque when the machine is unloaded is the sum of the cogging torques acting on each of the projections 7 of the stator 2. As there are N*K projections 7 on all of the stator 2, the total cogging torque Tr is equal to:

$$T_r = \frac{C^2 \cdot P \cdot (R_{ic}^2 - R_{es}^2)}{4L_r^2 \cdot \mu_0} \sin\left(\frac{K \cdot \omega}{2}\right) \cdot \sum_{n=1}^{N \cdot K} \sin\left(K \cdot \left[\theta + \frac{2\pi n}{N \cdot K}\right]\right)$$

This sum is always equal to 0 for N*K>1. The profile of the magnets 3, which was calculated to maintain a sinusoidal flux density within the steel, reduces at the same time the cogging torque which is generally present during a rotation when the machine is unloaded.

The flux density produced by the magnets 3 in the projections 7 of the stator is sinusoidal. The magnetic flux surrounded by the coils of one phase is the sum of the fluxes channelled by the projections wound by the corresponding winding. This sum of fluxes is also sinusoidal. The sum of the torques developed by each phase is constant for sinusoidal phase currents which are similarly phase-shifted with respect to the flux linkages. Consequently, the machine is free of cogging torque when in operation. Also, a sinusoidal current reduces the portion of Joules losses in the copper, associated to the skin effect. The lost is minimum as the harmonic content of the current within the copper has only one component.

Figure 2:
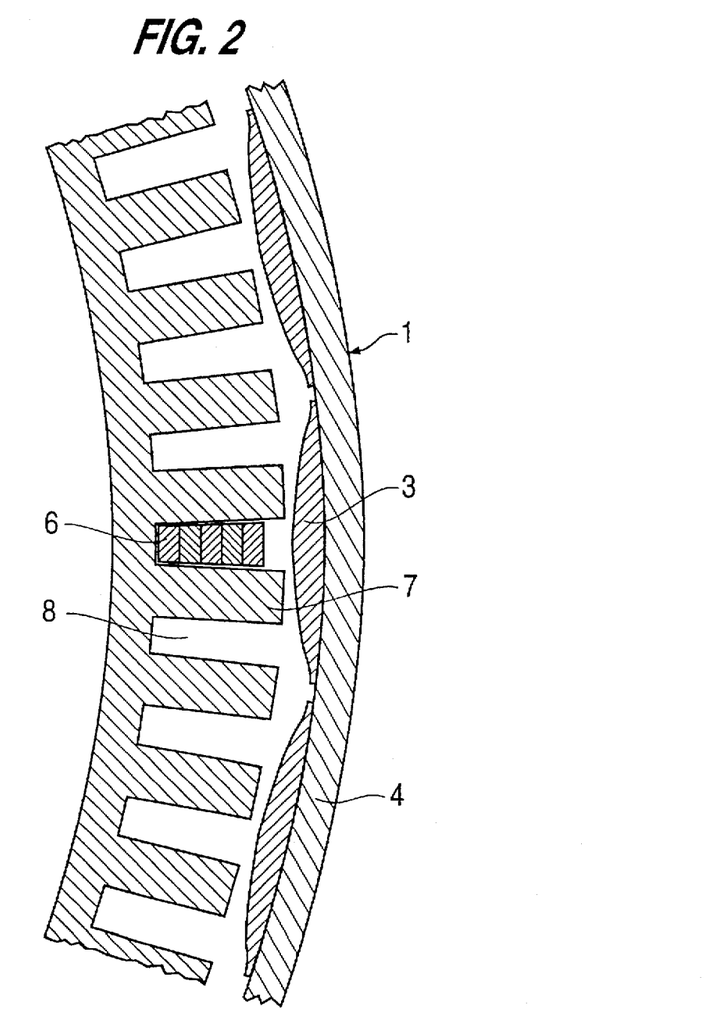
FIG. 2 is a partial side cross section view of the stator and rotor frames of a multiphase brushless AC electric machine according to a second embodiment of the present invention.

Referring now to FIG. 2, the multiphase brushless AC electric machine is preferably characterized in that each of the projections 7 is square ended and each of the magnets 3 has truncated ends. Magnetic materials corresponding to removed extremities of each of the magnets 3 is added to the corresponding truncated end in such a manner to increase the thickness thereof.

Because of this modification, it is possible to produce magnets that are less fragile than the non-truncated magnets and that are easier to mount on the cylinder head 4 of the rotor 1. The consequences on the magnetic performances of the density flux are negligible.

Figure 3:
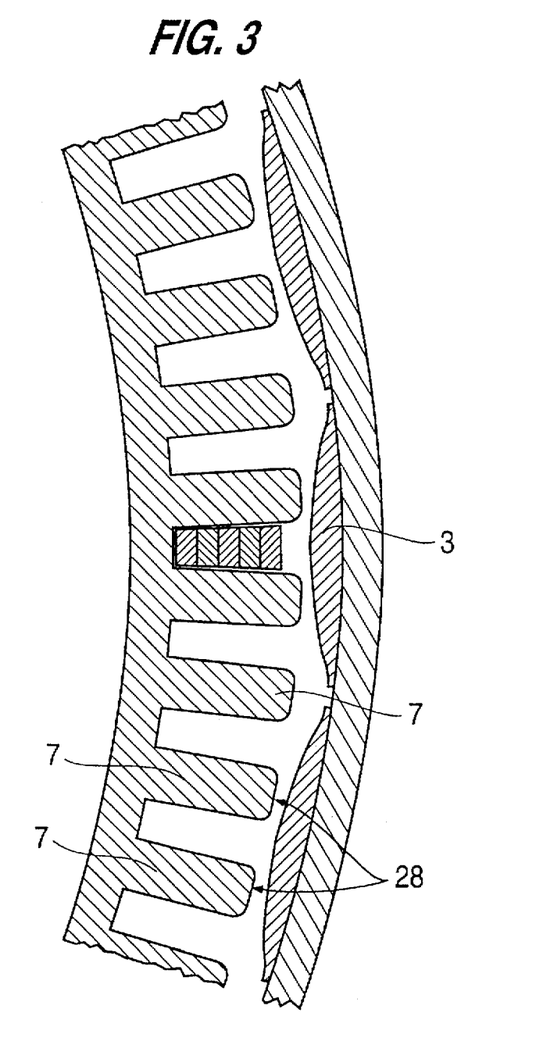
FIG. 3 is a partial side cross section view of the stator and rotor frames of a multiphase brushless AC electric machine according to a third embodiment of the present invention.

Referring now to FIG. 3, the multiphase brushless AC electric machine is preferably characterized in that each of the projections 7 is round ended and each of the magnets 3 has truncated ends. Magnetic materials corresponding to removed extremities of each of the magnets is added to the corresponding truncated end in such a manner to increase the thickness thereof.

Preferably, the projections 7 have rounded ends 28. Because of that, it is possible to eliminate the funnel effect of the flux density, which results in a saturation in the projections 7 and increases the amplitude of harmonic components when the projections have square ends. Also, the magnetic flux leaks produced by the slot currents are reduced.

Preferably, the flux channelled in the projections 7 is produced by magnets having a higher magnetization to compensate the rounded ends of the projections 7.

Figure 4:
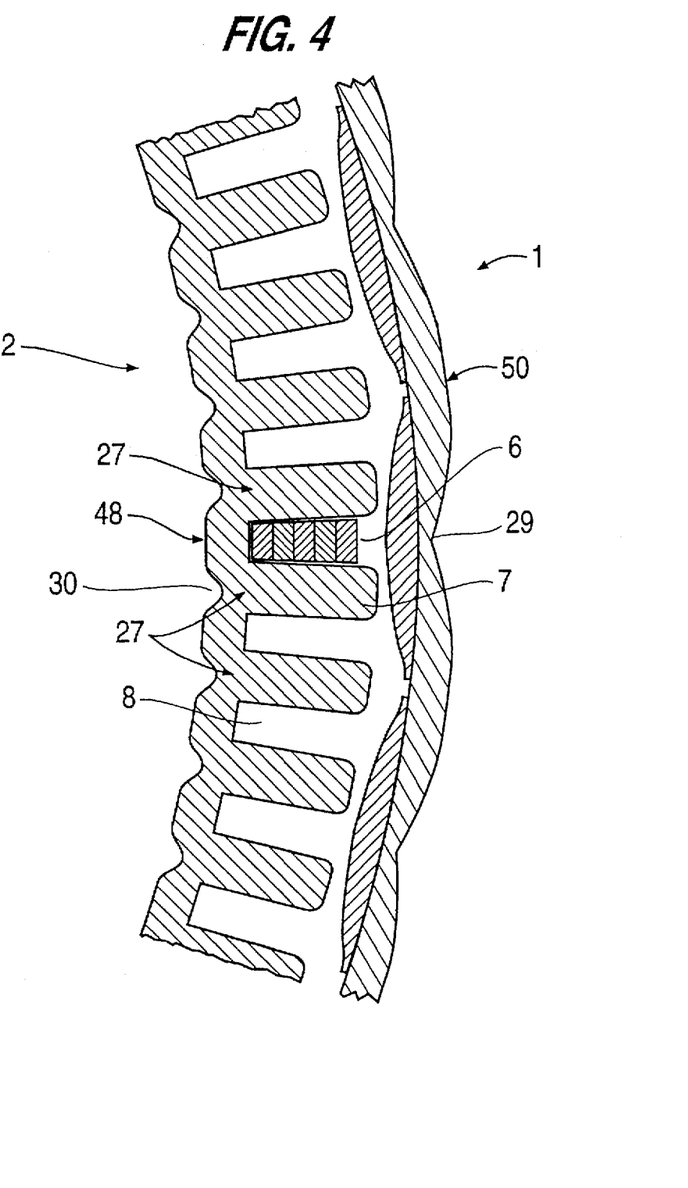
FIG. 4 is a partial side cross section view of the stator and rotor frames of a multiphase brushless AC electric machine according to a fourth embodiment of the present invention.

Referring now to FIG. 4, the multiphase brushless AC electric machine is preferably characterized in that the stator frame 2 has an inner surface 48 having recesses 30 substantially aligned with the respective projections 7. Also each of the projections 7 is round ended and each of the magnets 3 has truncated ends. Magnetic materials corresponding to removed extremities of each of the magnets 3 is added to the corresponding truncated end in such a manner to increase the thickness thereof. The rotor frame 1 has an outer surface 50 having recesses 29 substantially aligned with central portions of the respective magnets 3.

It is also a preferable object of the present invention to provide a machine having a reduced weight by removing zones where magnetic flux is low as shown in FIG. 4. Steel has been removed in zones 29 and 30 where the maximum flux density is low. Because of that, the flux density in the remaining portions adjacent to zones 29 and 30 is increased to a level similar to the one occurring in the machine in general.

With the embodiment shown in FIG. 4, another object of the present invention is reached by means of a brushless polyphase AC electric machine where the stator magnetic circuit geometry is smaller to reduce its weight.

Figure 5:
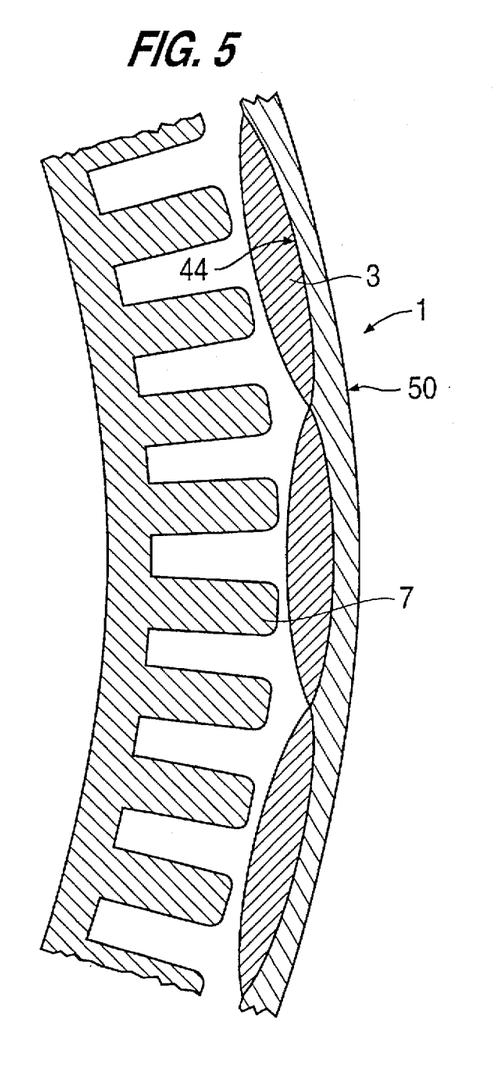
FIG. 5 is a partial side cross section view of the stator and rotor frames of a multiphase brushless AC electric machine according to a fifth embodiment of the present invention.

Referring now to FIG. 5, the multiphase brushless AC electric machine is preferably characterized in that the rotor frame 1 has a cylindrical outer surface 50. Each of the projections 7 is round ended and the inner surface 44 of the rotor frame 1 is provided with inwardly curved housings for receiving respectively the permanent magnets 3.

Figure 6:
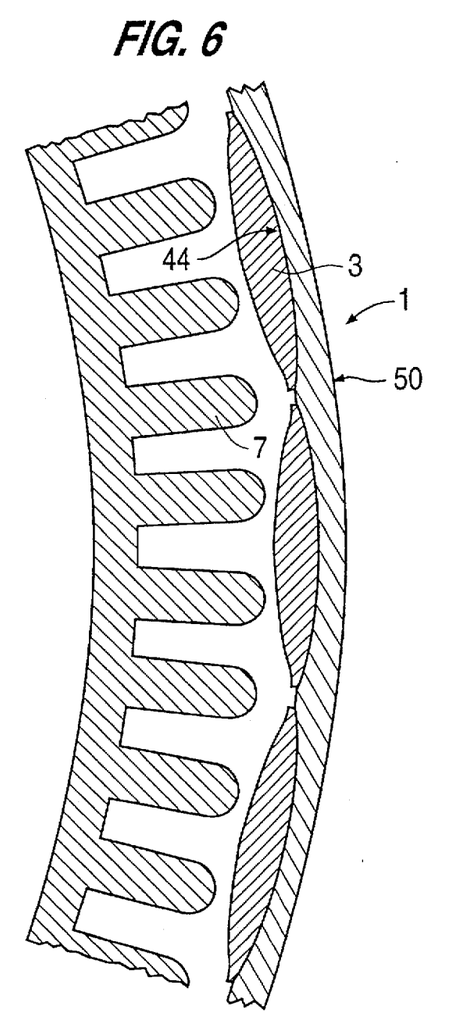
FIG. 6 is a partial side cross section view of the stator and rotor frames of a multiphase brushless AC electric machine according to a sixth embodiment of the present invention.

Referring now to FIG. 6, the multiphase brushless AC electric machine is preferably characterized in that the rotor frame 1 has a cylindrical outer surface 50. Each of the projections 7 is round ended. Each of the magnets 3 has truncated ends. Magnetic materials corresponding to removed extremities of each of the magnets 3 is added to the corresponding truncated end in such a manner to increase the thickness thereof. The inner surface 44 of the rotor frame 1 being provided with inwardly curved housings for receiving respectively the permanent magnets 3.

Figure 7:
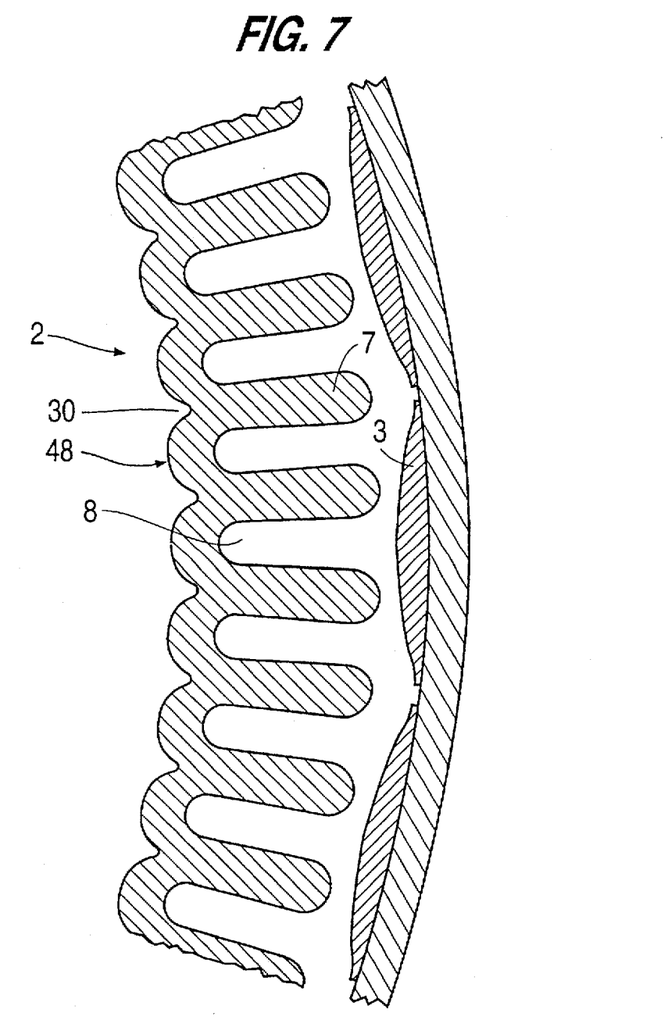
FIG. 7 is a partial side cross section view of the stator and rotor frames of a multiphase brushless AC electric machine according to a seventh embodiment of the present invention.
Figure 8:
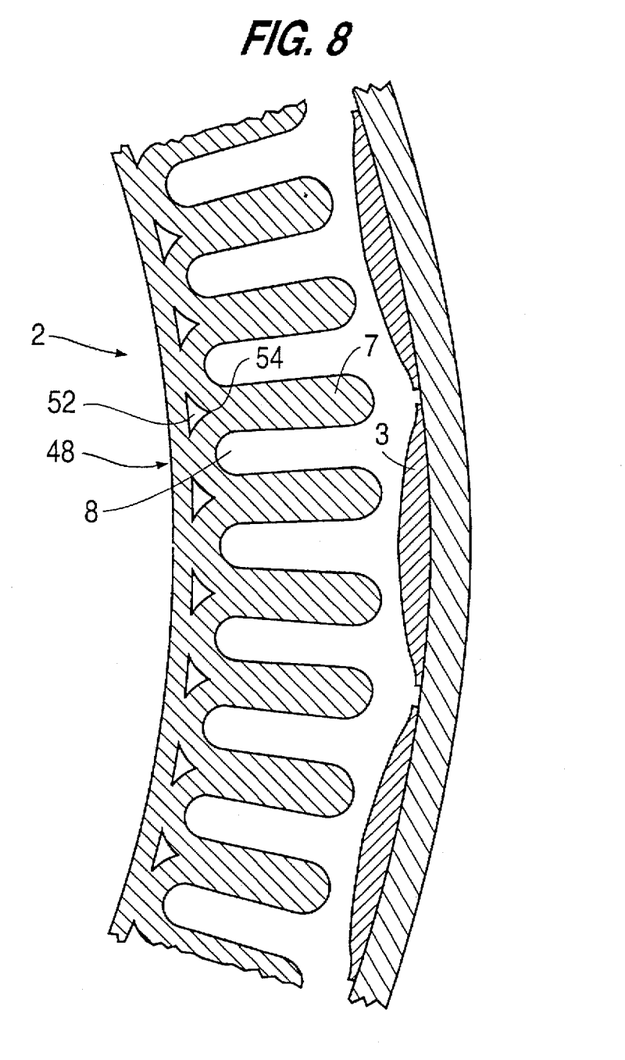
FIG. 8 is a partial side cross section view of the stator and rotor frames of a multiphase brushless AC electric machine according to an eighth embodiment of the present invention.

Referring now to FIG. 7, the multiphase brushless AC electric machine is preferably characterized in that the stator frame 2 has an inner corrugated surface 48 defining recesses 30 substantially aligned with the respective projections 7. Each of the slots 8 is terminated by a round ended bottom. Each of the projections 7 is round ended and each of the magnets 3 has truncated ends. Magnetic materials corresponding to removed extremities of each of the magnets 3 is added to the corresponding truncated end in such a manner to increase the thickness thereof.

Figure 9:
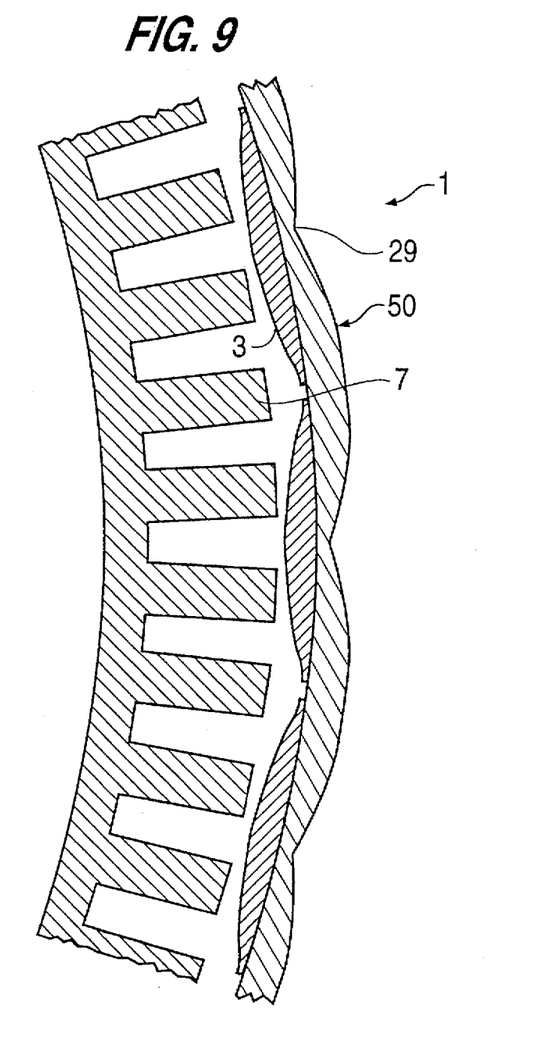
FIG. 9 is a partial side cross section view of the stator and rotor frames of a multiphase brushless AC electric machine according to a ninth embodiment of the present invention.

Referring now to FIG. 9, the multi phase brushless AC electric machine is preferably characterized in that the stator frame 2 has an inner surface 48 and the stator frame 2 is provided with transverse cavities 52 substantially aligned with the respective projections 7. Each of the cavities 52 is located at mid distance between a lower end of the corresponding projection 7 and the inner surface 48 of the stator frame 2. Each of the cavities 52 has a substantially triangular shape with a summit 54 thereof facing the corresponding projection 7. Each of the slots 8 is terminated by a round ended bottom. Each of the projections 7 is round ended and each of the magnets 3 has truncated ends. Magnetic materials corresponding to removed extremities of each of the magnets 3 is added to the corresponding truncated end in such a manner to increase the thickness thereof.

Referring now to FIG. 9, the multiphase brushless AC electric machine is preferably characterized in that each of the projections 7 is square ended and each of the magnets 3 has truncated ends. Magnetic materials corresponding to removed extremities of each of the magnets 3 is added to the corresponding truncated end in such a manner to increase the thickness thereof. The rotor frame 1 has an outer surface 50 having recesses 29 substantially aligned with central portions of the respective magnets 3.

Figure 10:
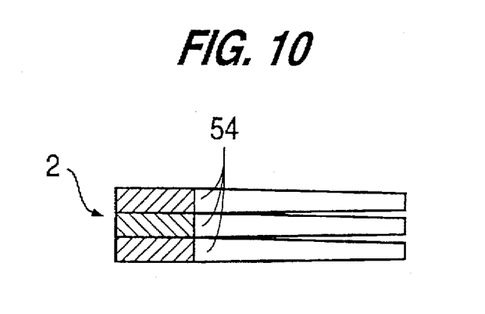
FIG. 10 is a partial cross section view of FIG. 1 with respect to lines X—X according to an embodiment of the present invention.

Referring now to FIG. 10, the multiphase brushless AC electric machine is preferably characterized in that the stator frame 2 is made of a series of adjacent metal sheets 54 having peripheral portions forming the projections 7 and the peripheral portions of the metal sheets 54 having tapered thicknesses toward periphery thereof.

Figure 11:
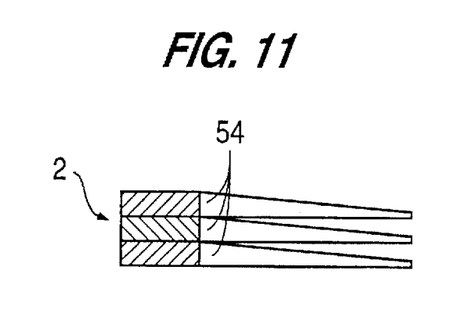
FIG. 11 is a partial cross section view of FIG. 1 with respect to lines X—X according to another embodiment of the present invention.

Referring now to FIG. 11, the multiphase brushless AC electric machine is preferably characterized in that the stator frame 2 is made of a series of adjacent metal sheets 54 having peripheral portions forming the projections 7 and the peripheral portions of the metal sheets 54 having non-symmetrical tapered thicknesses toward periphery thereof.

The base of each projection 27 is narrower than the end thereof, This shape is needed to maintain physical contact between the rectangular conductors 6 and the sidewall of the slot 8 to increase thermal conductivity. This narrowing of each projection forces the flux density channelled by each projection 7 to concentrate itself more in the base of the corresponding projection than in its end in a case where the thickness of each metal sheets of the stator is uniform.

Referring now to FIGS. 10 and 11, the thickness of each projection is tapered from the base thereof to the end thereof. Because of this, it is possible to reduce the steel quantity in each projection. Then, the funnel effect acting upon the field lines is eliminated and it is possible to increase the maximum flux density in each projection so that it be substantially uniform within all of its volume. By removing steel portions as shown in FIG. 4 and by using metal sheets having tapered thickness as shown in FIGS. 10 and 11, the steel is used at its full capacity as a flux channelling medium for decreasing the weight of the machine without affecting the harmonic content of the flux density.

In the machine according to the present invention, the magnets are used to produce a magnetic field in a machine which is provided with a group of conductors excited by polyphase and sinusoidal alternative currents to obtain a rotary machine. Preferably, the magnets are profile magnets made of homogeneous material and mounted onto the internal wall of the cylindrical rotor so that they face a series of projections and slots, the slots being without slot tips.

According to the present invention, a sinusoidal shaped magnetic field is produced in the polar parts to reduce the harmonic components except the fundamental and consequently to reduce the losses. Because of that, a high torque with a very low cogging torque is obtained. Also, the weight of the polar parts is reduced.

With preferred embodiments of the present invention, it is possible to use full axial length rectangular cross section conductors to obtain a high filling factor. Also, it is possible to reduce flux concentrations by using rounded end projections to reduce harmonic losses due to saturation. Also, it is possible to reduce the stator weight by removing stator zones through which low flux density is induced. Furthermore, it is possible to reduce the rotor weight by removing rotor zones through which low density flux is induced.

Although the present invention has been explained hereinafter by way of preferred embodiments thereof, it should be pointed out that any modifications to these preferred embodiments, within the scope of the appended claims, are not deemed to change or alter the nature and scope of the present invention.

What is claimed is:

1. A multiphase brushless AC electrical machine comprising:

a stator frame having a surface provided with parallel slots and projections disposed alternately, each of said slots having an opening onto said surface, each of said openings being substantially as wide as the widest width of the corresponding slot, the stator frame having winding conductors mounted within the slots; and a rotor frame having a surface provided with permanent magnet means having respective surface sections facing said slots and projections, each of said surface sections facing a number of said slots which corresponds to a number of phases upon which said machine operates, all of said surface sections of said magnet means producing a magnetic flux density having a component average amplitude $B_r(\theta)$ perpendicular to the corresponding surface of the stator, which is substantially defined by the following equation:

$$B_r(\theta) = M_r(\theta) \cdot L_a(\theta)/L_r(\theta)$$

where $L_a(\theta)$ is defined by the following equation:

$$L_a(\theta) = abs\left[ \frac{C \cdot L_r(\theta)}{M_r(\theta)} \sin\left( \frac{K \cdot \theta}{2} \right) \right], \text{ and}$$

where $\theta$ is a position angle in radians with respect to a reference position on said rotor frame; $B_r(\theta)$ is said component average amplitude at said position angle $\theta$; $L_a(\theta)$ is a gap distance between said projections and said surface of said rotor frame at said position angle $\theta$; $M_r(\theta)$ is a component of residual induction of said magnet means at said position angle $\theta$, $M_r(\theta)$ being perpendicular to the corresponding surface of the stator, $M_r(\theta)$ being alternative with a period corresponding to $4\pi/K$; K is an even number representative of all of said surface sections; and C is an arbitrary constant, whereby, in operation, said rotor frame is magnetically coupled to said stator frame while reducing losses due to harmonic distortion of magnetic flux density within said stator frame, having a torque versus current curve that is linear for a larger current band and reducing cogging torque between said stator frame and said rotor frame.

2. A multiphase brushless AC electric machine according to claim 1, wherein:

the stator frame has a cylindrical shape, the surface provided with parallel slots and projections being an outer surface of the stator frame;

the rotor frame has a cylindrical shape, the surface provided with permanent magnet means being an inner surface of the rotor frame;

the average amplitude $B_r(\theta)$ is a radial component;

each of the slots has a rectangular cross section; and the permanent magnet means comprise a series of permanent magnets made of a homogeneous material, each of the magnets having a thickness with respect to the position angle $\theta$ determined substantially by $L_a(\theta)$.

3. A multiphase brushless AC electric machine according to claim 2, wherein:

each of the projections is square ended; and each of the magnets has truncated ends, magnetic materials corresponding to removed extremities of each of the magnets being added to the corresponding truncated end in such a manner to increase the thickness thereof.

4. A multiphase brushless AC electric machine according to claim 2, wherein:

each of the projections is round ended; and each of the magnets has truncated ends, magnetic materials corresponding to removed extremities of each of the magnets being added to the corresponding truncated end in such a manner to increase the thickness thereof.

5. A multiphase brushless AC electric machine according to claim 2, wherein:

the stator frame has an inner surface having recesses substantially aligned with the respective projections;

each of the projections is round ended; and each of the magnets has truncated ends, magnetic materials corresponding to removed extremities of each of the magnets being added to the corresponding truncated end in such a manner to increase the thickness thereof, the rotor frame having an outer surface having recesses substantially aligned with central portions of the respective magnets.

6. A multiphase brushless AC electric machine according to claim 2, wherein:

the rotor frame has a cylindrical outer surface;

each of the projections is round ended; and the inner surface of the rotor frame is provided with inwardly curved housings for receiving respectively the permanent magnets.

7. A multiphase brushless AC electric machine according to claim 2, wherein:

the rotor frame has a cylindrical outer surface;

each of the projections is round ended;

each of the magnets has truncated ends, magnetic materials corresponding to removed extremities of each of the magnets being added to the corresponding truncated end in such a manner to increase the thickness thereof, the inner surface of the rotor frame being provided with inwardly curved housings for receiving respectively the permanent magnets.

8. A multiphase brushless AC electric machine according to claim 2, wherein:

the stator frame having an inner corrugated surface defining recesses substantially aligned with the respective projections;

each of the slots is terminated by a round ended bottom;

each of the projections is round ended: and each of the magnets has truncated ends, magnetic materials corresponding to removed extremities of each of the magnets being added to the corresponding truncated end in such a manner to increase the thickness thereof.

9. A multiphase brushless AC electric machine according to claim 2, wherein:

the stator frame has an inner surface, the stator frame being provided with transverse cavities substantially aligned with the respective projections, each of the cavities being located at mid distance between a lower end of the corresponding projection and the inner surface of the stator frame, each of the cavities having a substantially triangular shape with a summit thereof facing the corresponding projection;

each of the slots is terminated, by a round ended bottom;

each of the projections is round ended; and each of the magnets has truncated ends, magnetic materials corresponding to removed extremities of each of the magnets being added to the corresponding truncated end in such a manner to increase the thickness thereof.

10. A multiphase brushless AC electric machine according to claim 2, wherein:

each of the projections is square ended; and each of the magnets has truncated ends, magnetic materials corresponding to removed extremities of each of the magnets being added to the corresponding truncated end in such a manner to increase the thickness thereof, the rotor frame having an outer surface having recesses substantially aligned with central portions of the respective magnets.

11. A multiphase brushless AC electric machine according to claim 2, wherein:

the stator frame is made of a series of adjacent metal sheets having peripheral portions forming the projections; and said peripheral portions of the metal sheets having tapered thicknesses toward periphery thereof.

12. A multiphase brushless AC electric machine according to claim 2, wherein each of the projections is square ended.

13. A multiphase brushless AC electrical machine according to claim 1, wherein the winding conductors have a rectangular cross section.

14. A method of operating a multiphase brushless AC electric machine, comprising the steps of:

magnetically coupling a stator frame provided with windings with a rotor frame, the stator frame having a surface provided with parallel slots and projections disposed alternately, each of said slots having an opening onto said surface, each of said openings being substantially as wide as the widest width of the corresponding slot, the windings being mounted within the slots, the rotor frame having a surface provided with permanent magnet means having respective surface sections facing said slots and projections, each of said surface sections facing a number of said slots which corresponds to a number of phases upon which said machine operates, all of said surface sections of said magnet means producing a magnetic flux density having a component average amplitude $B_r(\theta)$ perpendicular to the corresponding surface of the stator, which is substantially defined by the following equation:

$$B_r(\theta) = M_r(\theta) \cdot L_a(\theta)/L_v(\theta)$$

where $L_a(\theta)$ is defined by the following equation:

$$L_a(\theta) = \text{abs}\left[ \frac{C \cdot L_v(\theta)}{M_r(\theta)} \sin\left( \frac{K \cdot \theta}{2} \right) \right], \text{ and}$$

where $\theta$ is a position angle in radians with respect to a reference position on said rotor frame; $B_r(a)$ is said component average amplitude at said position angle $\theta$; $L_v(\theta)$ is a gap distance between said projections and said surface of said rotor frame at said position angle $\theta$; $M_r(\theta)$ is a component of residual induction of said magnet means at said position angle $\theta$, $M_r(\theta)$ being perpendicular to the corresponding surface of the stator, $M_r(\theta)$ being alternative with a period corresponding to $4\pi/K$; K is an even number representative of all of said surface sections; and C is an arbitrary constant; and energizing the windings of the stator, whereby, in operation, said rotor frame is magnetically coupled to said stator frame while reducing losses due to harmonic distortion of magnetic flux density within said stator frame, having a torque versus current curve that is linear for a larger current band and reducing cogging torque between said stator frame and said rotor frame.

15. A motor, comprising:

a rotor having N convexly-shaped magnets adjacently positioned onto an inner circumferential surface of the rotor, N being an integer greater than one;

a stator having K projections facing said magnets, K being an integer greater than one and greater than N, wherein L of the K projections are in alignment with one of the N magnets, L being an integer greater than one.

16. The motor according to claim 15, wherein the projections have a rectangular shape.

17. The motor according to claim 15, wherein L is equal to 3.

18. The motor according to claim 15, wherein the stator frame has openings defining slots, said slots and the projections being disposed alternately, said openings being substantially as wide as the widest width of the corresponding slot, the stator frame having winding conductors mounted within the slots.

19. The motor according to claim 15, wherein the wiring conductors have a rectangular cross section.

20. The motor according to claim 15, wherein the number of projections L corresponds to a number of phases upon which said motor operates.

* * * * *